(12) United States Patent
Gu et al.

(10) Patent No.: US 11,736,488 B1
(45) Date of Patent: Aug. 22, 2023

(54) SYSTEMS AND METHODS FOR SELECTIVELY MONITORING DEVICES

(71) Applicant: GEN DIGITAL INC., Tempe, AZ (US)

(72) Inventors: Lei Gu, Bedford, MA (US); Chengi Kuo, Manhattan Beach, CA (US)

(73) Assignee: GEN DIGITAL INC., Tempe, AZ (US)

( * ) Notice: Subject to any disclaimer, the term of this patent is extended or adjusted under 35 U.S.C. 154(b) by 245 days.

(21) Appl. No.: 16/835,077

(22) Filed: Mar. 30, 2020

(51) Int. Cl.
*H04L 9/40* (2022.01)
*G06F 21/62* (2013.01)

(52) U.S. Cl.
CPC .......... *H04L 63/102* (2013.01); *G06F 21/6245* (2013.01); *H04L 63/1425* (2013.01)

(58) Field of Classification Search
CPC ................ H04L 63/102; G06F 21/6245; H04L 63/1425; H04L 65/1083; H04L 63/1408; H04L 63/1433; G06F 21/62; H04W 12/128
See application file for complete search history.

(56) References Cited

U.S. PATENT DOCUMENTS

| | | | | |
|---|---|---|---|---|
| 9,736,367 | B1* | 8/2017 | Alam et al. .......... | H04N 23/698 |
| 10,462,184 | B1* | 10/2019 | Gu et al. ................ | H04W 4/33 |
| 2010/0211997 | A1* | 8/2010 | McGeehan et al. .. | H04L 63/107 |
| | | | | 726/4 |
| 2013/0182107 | A1* | 7/2013 | Anderson .............. | H04N 7/183 |
| | | | | 382/107 |
| 2015/0382195 | A1* | 12/2015 | Grim et al. .......... | H04W 12/06 |
| | | | | 726/4 |
| 2016/0065554 | A1* | 3/2016 | Brown et al. ......... | H04L 63/20 |
| | | | | 726/1 |
| 2017/0085587 | A1* | 3/2017 | Turgeman ............ | G06F 21/32 |
| 2019/0347418 | A1* | 11/2019 | Strogov et al. ........ | G06F 21/44 |
| 2020/0137092 | A1* | 4/2020 | Yan et al. ............ | G06F 21/566 |
| 2020/0344508 | A1* | 10/2020 | Edwards et al. . | H04N 21/44222 |

OTHER PUBLICATIONS

Mao et al., "Anomalous Power-Usage Behavior Detection from Smart Home Wireless Communications," Journal of Communications and Information Networks Year: 2019 | Vol. 4, Issue: 1 | Journal Article | Publisher: PTP.*

Rahimi et al., "Usage monitoring of electrical devices in a smart home," 2011 Annual International Conference of the IEEE Engineering in Medicine and Biology Society Year: 2011 | Conference Paper | Publisher: IEEE.*

* cited by examiner

*Primary Examiner* — Roderick Tolentino
(74) *Attorney, Agent, or Firm* — Greenberg Traurig, LLP

(57) ABSTRACT

A computer-implemented method for selectively monitoring devices may include (i) identifying a set of characteristics of a device-usage session of a device, (ii) calculating, based on the set of characteristics, a privacy score for the device-usage session, (iii) selecting, for the device, a device monitoring profile that is correlated with the privacy score and that defines an intensity level of monitoring actions to be performed on the device, and (iv) monitoring activity performed on the device during the device-usage session in accordance with the device monitoring profile that is correlated with the privacy score for the device-usage session. Various other methods, systems, and computer-readable media are also disclosed.

20 Claims, 8 Drawing Sheets

SYSTEMS AND METHODS FOR SELECTIVELY MONITORING DEVICES

BACKGROUND

Mobile devices with access to the Internet are a valuable tool for children. Children can do schoolwork, coordinate with friends, and check in with parents. However, mobile devices with Internet access also present risks and challenges. Mobile devices are more difficult than desktops for parents and guardians to monitor, and Internet access on mobile devices can allow children to easily access unsuitable content without approval or oversight. Many parental controls exist to try to prevent children from accessing unapproved content or communicating with unapproved individuals, but there are many ways to circumvent such controls.

Some traditional systems address this problem by monitoring children's devices, enabling parents to see what activity the child is performing on the device. Monitoring a device can allow parents to address problem behavior as it happens, negating many of the risks of unsupervised Internet access. However, in some cases these systems may not capture enough data, failing to correctly identify suspicious activity. In other cases, traditional systems may capture too much data, straining a mobile device's limited processing power and filling up storage space with unnecessary data. The instant disclosure, therefore, identifies and addresses a need for systems and methods for selectively monitoring devices.

SUMMARY

As will be described in greater detail below, the instant disclosure describes various systems and methods for selectively monitoring devices by adjusting monitoring profiles based on characteristics of the device-usage session.

In one embodiment, a computer-implemented method for selectively monitoring devices may include (i) identifying a set of characteristics of a device-usage session of a device, (ii) calculating, based on the set of characteristics, a privacy score for the device-usage session, (iii) selecting, for the device, a device monitoring profile that is correlated with the privacy score and that defines an intensity level of monitoring actions to be performed on the device, and (iv) monitoring activity performed on the device during the device-usage session in accordance with the device monitoring profile that is correlated with the privacy score for the device-usage session.

In some examples, identifying the set of characteristics may include identifying a type of a current location of the device via (i) a geolocation of the current location of the device, (ii) still images of the current location of the device captured by a camera of the device, (iii) video of the current location of the device captured by a camera of the device, and/or (iv) a wireless network to which the device is connected. In some examples, identifying the set of characteristics may include identifying people in the vicinity of the device. Additionally or alternatively, identifying the set of characteristics may include identifying current activity performed on the device by a user via (i) monitoring active applications on the device, (ii) taking screenshots of the device, (iii) monitoring a camera of the device, and/or (iv) monitoring a microphone of the device.

In some embodiments, calculating the privacy score for the device-usage session may include comparing current values for the set of characteristics to recorded patterns of activity for the set of characteristics to determine whether the current values match the recorded patterns of activity. In one embodiment, calculating, based on the set of characteristics, the privacy score for the device-usage session may include calculating the privacy score based on a custom weighting for the set of characteristics supplied by an administrator of the device.

In one embodiment, the monitoring actions may include (i) recording a video of activity on the device, (ii) recording a screenshot of activity on the device, and/or (iii) recording audio of activity on the device. In some examples, monitoring activity performed on the device during the device-usage session in accordance with the device monitoring profile may include sending information about the activity performed on the device during the device-usage session to a server that analyzes the activity for suspicious behavior.

In one embodiment, selecting, for the device, the device monitoring profile that is correlated with the privacy score may include selecting the device monitoring profile from a set of monitoring profiles where, for each monitoring profile, an amount of computing resources consumed by monitoring the device in accordance with the monitoring profile is directly correlated with a privacy score associated with the monitoring profile.

In one embodiment, a system for implementing the above-described method may include (i) an identification module, stored in memory, that identifies a set of characteristics of a device-usage session of a device, (ii) a calculation module, stored in memory, that calculates, based on the set of characteristics, a privacy score for the device-usage session, (iii) a selection module, stored in memory, that selects, for the device, a device monitoring profile that is correlated with the privacy score and that defines an intensity level of monitoring actions to be performed on the device, (iv) a monitoring module, stored in memory, that monitors activity performed on the device during the device-usage session in accordance with the device monitoring profile that is correlated with the privacy score for the device-usage session, and (v) at least one physical processor that executes the identification module, the calculation module, the selection module, and the monitoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a set of characteristics of a device-usage session of a device, (ii) calculate, based on the set of characteristics, a privacy score for the device-usage session, (iii) select, for the device, a device monitoring profile that is correlated with the privacy score and that defines an intensity level of monitoring actions to be performed on the device, and (iv) monitor activity performed on the device during the device-usage session in accordance with the device monitoring profile that is correlated with the privacy score for the device-usage session.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
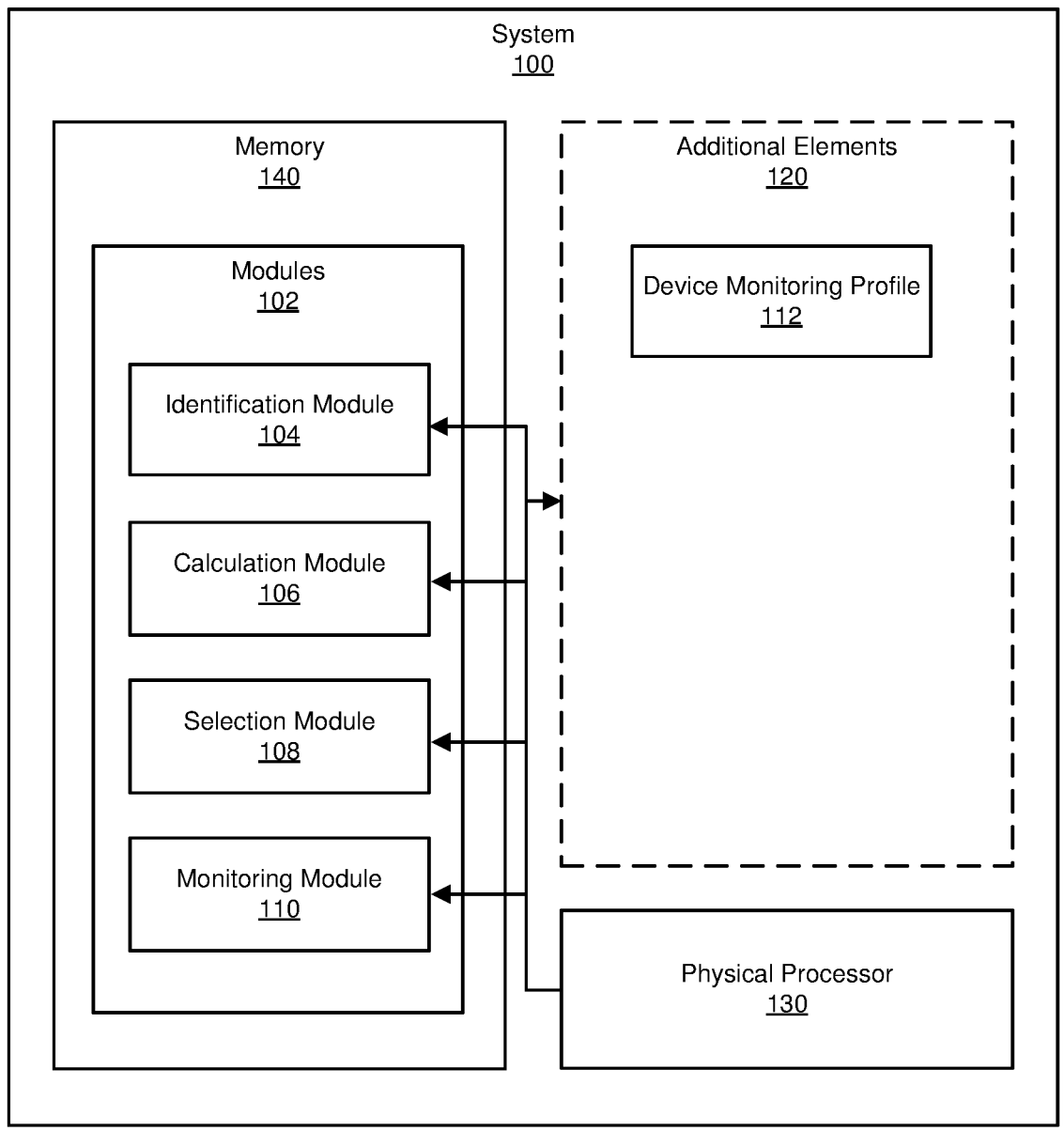
FIG. 1 is a block diagram of an example system for selectively monitoring devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for selectively monitoring devices. As will be explained in greater detail below, by selecting a monitoring profile based on characteristics of a device-usage session, the systems and methods described herein may provide an appropriate level of monitoring that identifies suspicious behavior without making excessive use of computing resources. By selecting a monitoring profile in this way, the systems and methods described herein may be able to improve the quality of monitoring of a computing device, identifying a larger portion of potentially suspicious behavior while conserving computing resources. In addition, the systems and methods described herein may improve the functioning of a computing device by detecting suspicious behavior with greater efficiency and thus reducing the computing device's resource usage. These systems and methods may also improve the field of computer monitoring and/or parental controls by improving the ability of parents and/or guardians to monitor a child's behavior on a computing device.

The following will provide, with reference to FIGS. 1, 2, 4, and 5, detailed descriptions of example systems for selectively monitoring devices. Detailed descriptions of corresponding computer-implemented methods will also be provided in connection with FIG. 3. Additionally, detailed descriptions of an example illustration of a device and device administrator will be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of example system 100 for selectively monitoring devices. As illustrated in this figure, example system 100 may include one or more modules 102 for performing one or more tasks. For example, and as will be explained in greater detail below, example system 100 may include an identification module 104 that identifies a set of characteristics of a device-usage session of a device. Example system 100 may additionally include a calculation module 106 that calculates, based on the set of characteristics, a privacy score for the device-usage session. Example system 100 may also include a selection module 108 that selects, for the device, a device monitoring profile that is correlated with the privacy score and that defines an intensity level of monitoring actions to be performed on the device. Example system 100 may additionally include a monitoring module 110 that monitors activity performed on the device during the device-usage session in accordance with the device monitoring profile that is correlated with the privacy score for the device-usage session. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate selectively monitoring devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as device monitoring profile 112. Device monitoring profile 112 generally represents any type or form of profile that stores settings for a set of one or more monitoring activities to be performed on a device. In one example, device monitoring profile 112 may specify that a monitoring system will take screenshots at a specified interval, such as every thirty seconds, every minute, and/or every five minutes. In another example, device monitoring profile 112 may specify that the systems described herein will record all activity of an application on a device. Additionally or alternatively, device monitoring profile 112 may specify monitoring activity for various components of a device, such as a front-facing camera, rear-facing camera, microphone, location sensor, and/or any other suitable component.

Figure 2:
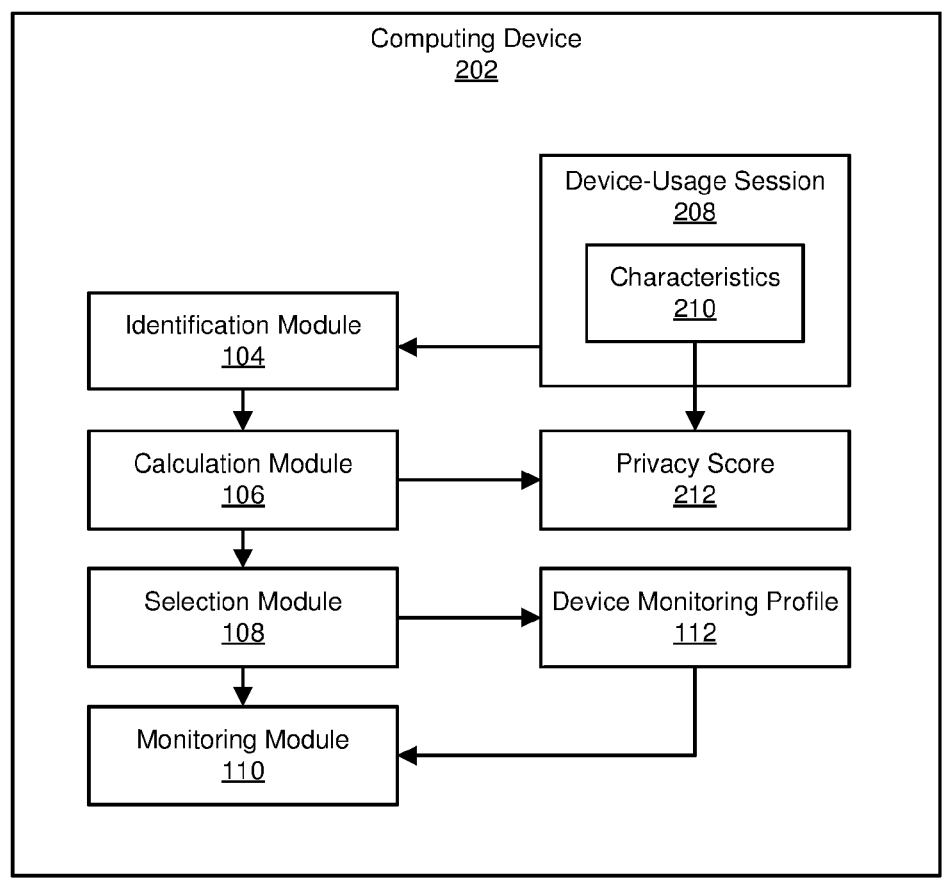
FIG. 2 is a block diagram of an additional example system for selectively monitoring devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to selectively monitor devices. For example, and as will be described in greater detail below, identification module 104 may identify a characteristics 210 of a device-usage session 208 of computing device 202. Calculation module 106 may calculate, based on characteristics 210, a privacy score 212 for device-usage session 208. In some examples, selection module 108 may select, for computing device 202, a device monitoring profile 112 that is correlated with privacy score 212 and that defines an intensity level of monitoring actions to be performed on computing device 202. After device monitoring profile 112 is selected, monitoring module 110 may monitor activity performed on computing device 202 during device-usage session 208 in accordance with device monitoring profile 112 that is correlated with privacy score 212 for device-usage session 208.

Computing device 202 generally represents any type or form of computing device capable of reading computer-executable instructions. In some embodiments, computing device 202 may represent a mobile device such as a smart phone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Figure 3:
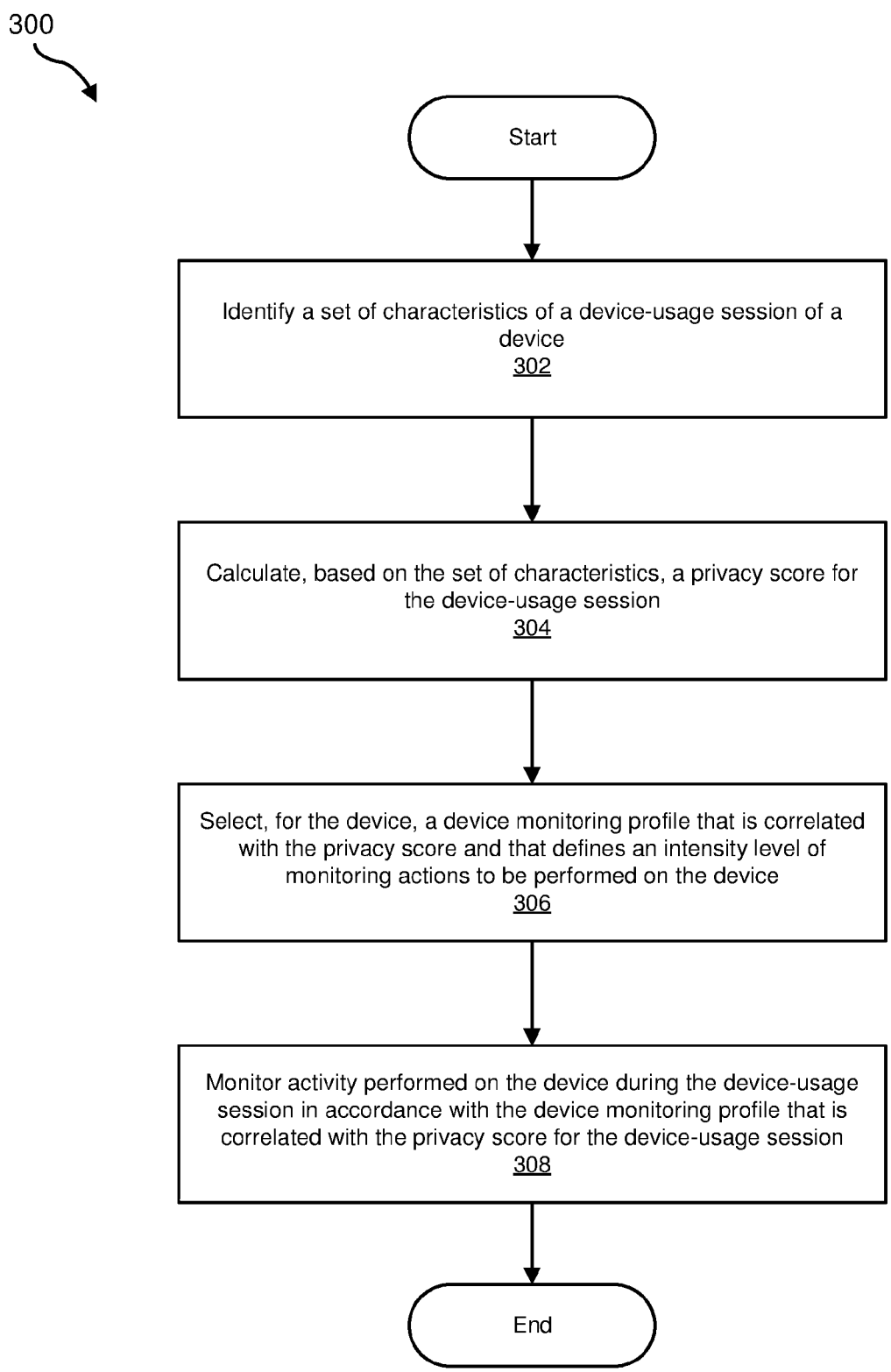
FIG. 3 is a flow diagram of an example method for selectively monitoring devices.

FIG. 3 is a flow diagram of an example computer-implemented method 300 for selectively monitoring devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a set of characteristics of a device-usage session of a device. For example, identification module 104 may, as part of computing device 202 in FIG. 2, identify characteristics 210 of device-usage session 208 of computing device 202.

The term "device-usage session," as used herein, generally refers to a period of interaction with a device that is bounded by time and/or another characteristic. For example, the systems described herein may define a device-usage session to last a set amount of time (e.g., ten minutes, half an hour, one hour, etc.) and may reevaluate the characteristics of the current device-usage session at every time boundary. Additionally or alternatively, a device-usage session may end and a new device usage-session begin as soon as any characteristic of the user's interaction with the device changes. For example, a device-usage session may end and/or begin when a user moves from one location to another, opens an application, closes an application, communicates with a new user, and/or interacts with a component of the device (e.g., a microphone). In some embodiments, a device-usage session may represent continuous usage of a device and may end after a predetermined span of time (e.g., one minute, five minutes, ten minutes, etc.) passes without a user interacting with the device. In some examples, the systems described herein may define a device-usage session based on a combination of the above factors.

The term "characteristics," as used herein, generally refers to any aspect of a device's state and/or a user's interactions with a device. In some embodiments, a characteristic may be a feature of activity on and/or around the device. For example, a set of characteristics of a device-usage session may include a location of the device, the set of applications open on the device, the current application being interacted with on the device, any hardware components of the device that are currently active (e.g., camera, microphone, etc.), nearby people who are not the user of the device, behavior of the user of the device (e.g., speaking loudly into the microphone, speaking quietly into the microphone, etc.), time of day (e.g., morning, evening, typical school hours, etc.), networks to which the device is connected, servers and/or other devices with which the device is communicating, and/or any other relevant feature of activity on and/or near the device.

Identification module 104 may identify the set of characteristics in a variety of ways. For example, identification module 104 may monitor activity on and/or around the device at all times. Additionally or alternatively, identification module 104 may identify characteristics of a device-usage session when a new device-usage session is initiated. In some embodiments, identification module 104 may determine that a new device-usage session has started based on specific triggers. For example, identification module 104 may determine that a new device-usage session has started based on the device connecting to or disconnecting from another device (e.g., a user's parent's device)via a network and/or near field communication system, when a certain time window begins and/or ends (e.g., at 3 P.M. when the school day ends), and/or when the device enters and/or leaves a specified location (e.g., home, school, the library, etc.).

In some embodiments, identification module 104 may identify, as a characteristic of a device-usage session, a location of the device. For example, identification module 104 may use a location sensor of the device, such as a global positioning system (GPS) sensor, to identify a location of the device. In some embodiments, identification module 104 may identify a type of location of the device, such as home, school, library, shopping mall, transit center, and/or any other suitable category of location. In one example, a type of location may be an open space (e.g., a library or classroom) versus a closed space (e.g., a bedroom or bathroom). In another example, a type of location may be a public space versus a private space. In some examples, identification module 104 may identify the type of the current location of the device via a geolocation (e.g., latitude and longitude, street address, etc.) of the current location of the device, for example by cross-referencing the geolocation with a database of location types at different addresses and/or within different geolocation boundaries. Additionally or alternatively, identification module 104 may use still images of the current location of the device captured by a camera of the device and/or video of the current location of the device captured by a camera of the device to identify the type of location (e.g., based on identifying objects present in the image and/or video and correlating the objects to a type of location). In some embodiments, identification module 104 may use a wireless network to which the device is connected to identify the type of location, for example by cross-referencing an identifier of the network with a stored list of identifiers of networks in locations of known types (e.g., a known home network, a known library network, etc.) and/or analyzing an identifier of the network to determine the location type (e.g., detecting the word "library" in the network identifier to determine that the network is probably a library network).

In some examples, identification module 104 may identify the set of characteristics by identifying people in the vicinity of the device. For example, identification module 104 may determine whether the user is surrounded by familiar adults (e.g., adults on a whitelist of known adults), unfamiliar adults, children, and/or other types of people. In one embodiment, identification module 104 may identify people by scanning a network to which the device is connected for identifiers of known devices (e.g., a smartphone belonging to the user's parent, a tablet belonging to the user's friend, etc.). Additionally or alternatively, identification module 104 may use facial recognition algorithms on images and/or video captured by the device to identify people in the vicinity of the device.

In some examples, identification module 104 may identify a current activity being performed on the device. For example, identification module 104 may identify the current activity performed on the device by a user via at least one of (i) monitoring active applications on the device, (ii) taking screenshots of the device, (iii) monitoring a camera of the device, and/or (iv) monitoring a microphone of the device. In one example, identification module 104 may identify that a user of the device is engaging in a video call by determining that a video chat application is active and/or determining that a video camera of the device is active. In another example, identification module 104 may identify that a user of the device is browsing the Internet by determining that a web browser application of the device is active.

In some embodiments, identification module 104 may identify a type of application and/or website. For example, identification module 104 may distinguish between educational, recreational, and/or communication applications and/or websites. In some embodiments, identification module 104 may categorize applications and/or websites by a trust metric that indicates the level of privacy of the application and/or website. In one example, a group text chat application may be more trusted than an individual video chat application. In some examples, identification module 104 may identify an age-appropriateness rating of a website, application, and/or item of media (e.g., video) on the device. In some examples, identification module 104 may identify other users of an application. For example, identification module 104 may distinguish between communication with a group of children, a trusted adult (e.g., on a whitelist of trusted adults), and/or an unknown adult.

In some embodiments, identification module 104 may identify a characteristic by comparing current behavior with typical and/or historical behavior. For example, if a user is browsing websites typically browsed by the user and/or chatting with people with whom the user has historically conversed, identification module 104 may identify a characteristic of consistent device usage. In another example, if a user is browsing atypical websites (e.g., that the user has not accessed before) and/or chatting with new people, identification module 104 may identify a characteristic of atypical device usage.

Figure 4:
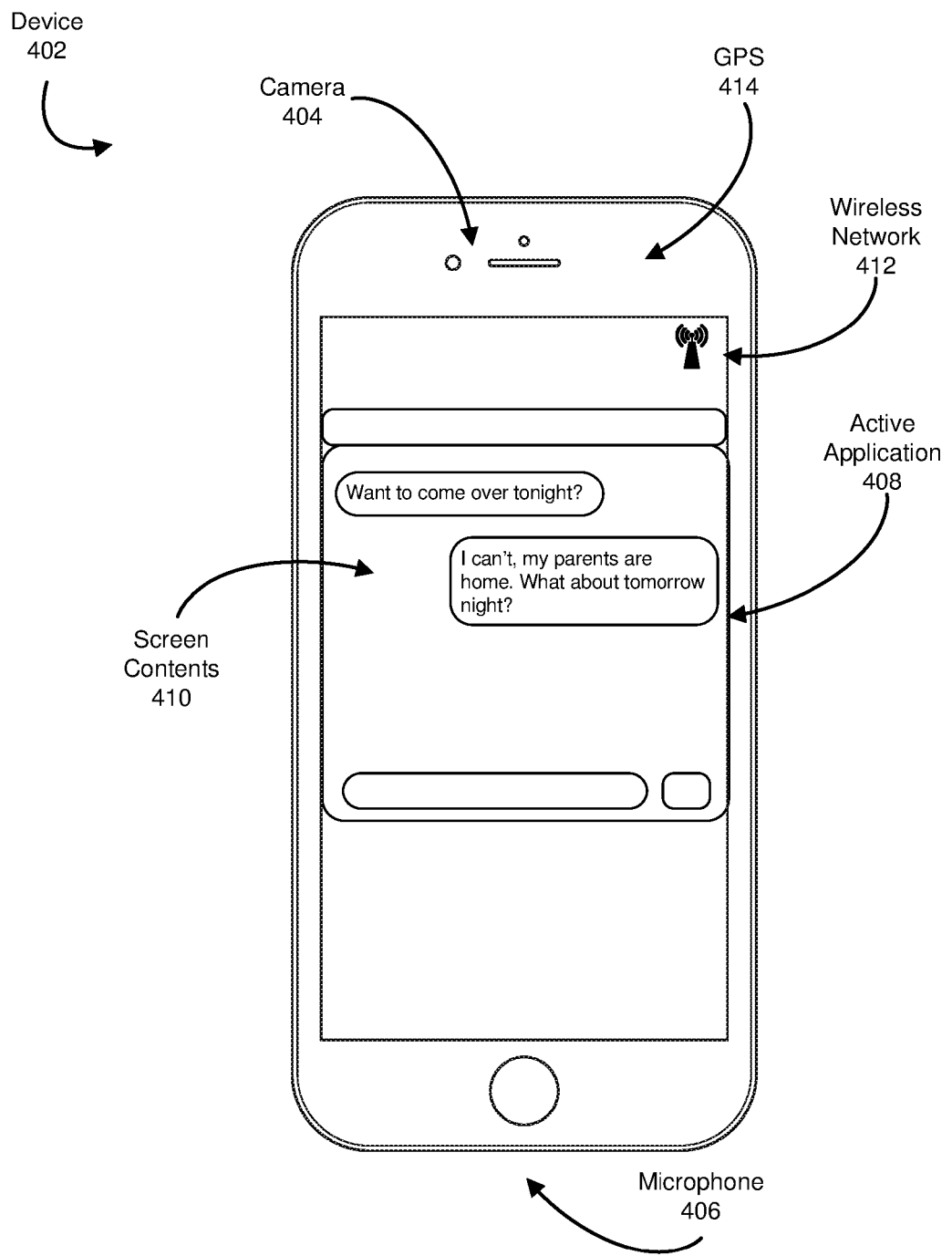
FIG. 4 is an illustration of an example computing system for selectively monitoring devices.

In some embodiments, identification module 104 may identify different types of characteristics associated with different hardware and/or software components of a device. For example, as illustrated in FIG. 4, a device 402 may have a camera 404 that identification module 104 may use to identify people in the vicinity of device 402, the behavior of the user of device 402, the type of location of device 402, and/or other characteristics. In one embodiment, device 402 may have a microphone 406 that may enable identification module 104 to identify similar characteristics as camera 404.

In one example, device 402 may have an active application 408 from which identification module 104 may identify the type of active application, the activity being engaged in by the user (e.g., browsing the web, chatting, etc.), one or more people with whom the user is engaged in the activity (e.g., via tracking social networking accounts and/or identifying usernames and/or icons from screenshots), and/or various other characteristics. In some examples, identification module 104 may use screen contents 410 to determine information about active application 408 and/or other active applications (e.g., by performing text analysis and/or other types of analysis). In some embodiments, identification module 104 may use a wireless network 412 to which device 402 is connected to identify a location and/or type of location of device 402. Additionally or alternatively, identification module 104 may identify other devices connected to wireless network 412 to identify other people in the vicinity of the device. In one embodiment, identification module 104 may use a GPS 414 to identify a location and/or type of location of device 402. In some embodiments, identification module 104 may use various other hardware and/or software components of device 402 to identify additional characteristics of a device-usage session of device 402.

Returning to FIG. 3, at step 304, one or more of the systems described herein may calculate, based on the set of characteristics, a privacy score for the device-usage session. For example, calculation module 106 may, as part of computing device 202 in FIG. 2, calculate, based on characteristics 210, privacy score 212 for device-usage session 208.

The term "privacy score," as used herein, generally refers to any representation of an aggregation of characteristics for a device-usage session. In some embodiments, a privacy score may include a numerical value. In one embodiment, a higher privacy score may indicate a device-usage session that is more suspicious (e.g., more likely to include potentially harmful behavior) while a lower privacy score may indicate a less suspicious device-usage session.

Calculation module 106 may calculate a privacy score in a variety of ways. For example, calculation module 106 may calculate the privacy score by representing each characteristic as a numerical value, weighting each characteristic according to a privacy score calculation schema, and summing the weighted values representing each characteristic.

For example, the people nearby the device (e.g., familiar adults, children, and/or no one) may have a higher weight than the type of application open on the device.

In some embodiments, the systems described herein may include a default privacy score calculation schema that assigns a weight to each characteristic. Additionally or alternatively, the systems described herein may enable administrators to create custom weighting schemas and calculation module 106 may calculate the privacy score for the device-usage session based on a custom weighting for the set of characteristics supplied by an administrator of the device. For example, an administrator may determine that the type of location (e.g., home, school, library, etc.) has a greater impact than represented in the default privacy score calculation schema and may increase the weighting of the location type characteristic. In some embodiments, the systems described herein may monitor the effectiveness of custom weighting schemas (e.g., by observing whether privacy scores generated by custom schemas correlate with suspicious behavior identified during device-usage sessions) in order to update the default weighting schema to a more effective model.

In some embodiments, calculation module 106 may calculate a higher privacy score for situations that are connected to a higher probability of suspicious behavior. For example, calculation module 106 may assign a higher privacy score to viewing age-inappropriate media, chatting with strangers, using a device while alone, and/or interacting with applications with low trust metrics compared to viewing age-appropriate media, chatting with known trusted users, using a device while in a public and/or group setting, and/or interacting with applications with high trust metrics. In some examples, calculation module 106 may assign a higher privacy score to atypical behavior such as visiting new websites, visiting new physical locations, communicating with strangers, speaking in an abnormal voice (e.g., whispering) and/or being in the vicinity of strangers than to typical behavior.

At step 306, one or more of the systems described herein may select, for the device, a device monitoring profile that is correlated with the privacy score and that defines an intensity level of monitoring actions to be performed on the device. For example, selection module 108 may, as part of computing device 202 in FIG. 2, select, for the device, device monitoring profile 112 that is correlated with privacy score 212 and that defines an intensity level of monitoring actions to be performed on computing device 202.

The term "device monitoring profile," as used herein, generally refers to any set of instructions for monitoring actions to be performed on a device. For example, a device monitoring profile may specify the types of monitoring actions to be performed and/or the frequency at which monitoring actions will be performed. In one example, a device monitoring profile may specify that screenshots are to be taken at specified intervals (e.g., every five seconds, every ten seconds, and/or every minute) but no other monitoring is to take place. In another example, a device monitoring profile may specify that the screen is to be recorded continuously and the forward-facing camera is to save images at specified intervals. In some examples, a device monitoring profile may monitor the screen, application activity, one or more specific applications, data sent and/or received (e.g., via a network), a camera, a microphone, a location sensor, and/or any other hardware and/or software component of a device. In some embodiments, different device monitoring profiles may consume different amounts of computing resources. For example, taking screenshots at intervals may consume less processing power and/or memory than continuously recording the screen. In another example, a device monitoring profile that specifies recording from a microphone may consume more processing power and/or memory than a device monitoring profile that does not specify recording from the microphone.

Selection module 108 may select the device monitoring profile in a variety of ways. In some embodiments, selection module 108 may select a device monitoring profile by comparing the privacy score with a range of privacy scores correlated with each device monitoring profile. For example, a device monitoring profile with a low level of monitoring may be correlated with privacy scores below 100, a device monitoring profile with a moderate level of monitoring may be correlated with privacy scores between 100 and 200, and a device monitoring profile with a high level of monitoring may be correlated with privacy scores above 200.

In one embodiment, selection module 108 may select the device monitoring profile from a set of monitoring profiles where, for each monitoring profile, an amount of computing resources consumed by monitoring the device in accordance with the monitoring profile is directly correlated with a privacy score associated with the monitoring profile. For example, a device monitoring profile with a high level of monitoring may consume more processing power and/or memory due to activating more hardware and/or software components of the device and/or storing more data. In some examples, by choosing a lower level of monitoring (e.g., due to a lower privacy score), the systems described herein may conserve computing resources.

At step 308, one or more of the systems described herein may monitor activity performed on the device during the device-usage session in accordance with the device monitoring profile that is correlated with the privacy score for the device-usage session. For example, monitoring module 110 may, as part of computing device 202 in FIG. 2, monitor activity performed on computing device 202 during device-usage session 208 in accordance with device monitoring profile 112 that is correlated with privacy score 212 for device-usage session 208.

Monitoring module 110 may monitor activity performed on the device in a variety of ways. For example, monitoring module 110 may monitor activity performed on the device via screenshots, recording audio and/or video, inspecting data sent to and/or from the device, and/or any other suitable type of monitoring. In one embodiment, the monitoring module 110 may monitor actions by at least one of recording a video of activity on the device, recording a screenshot of activity on the device, and/or recording audio of activity on the device.

Figure 5:
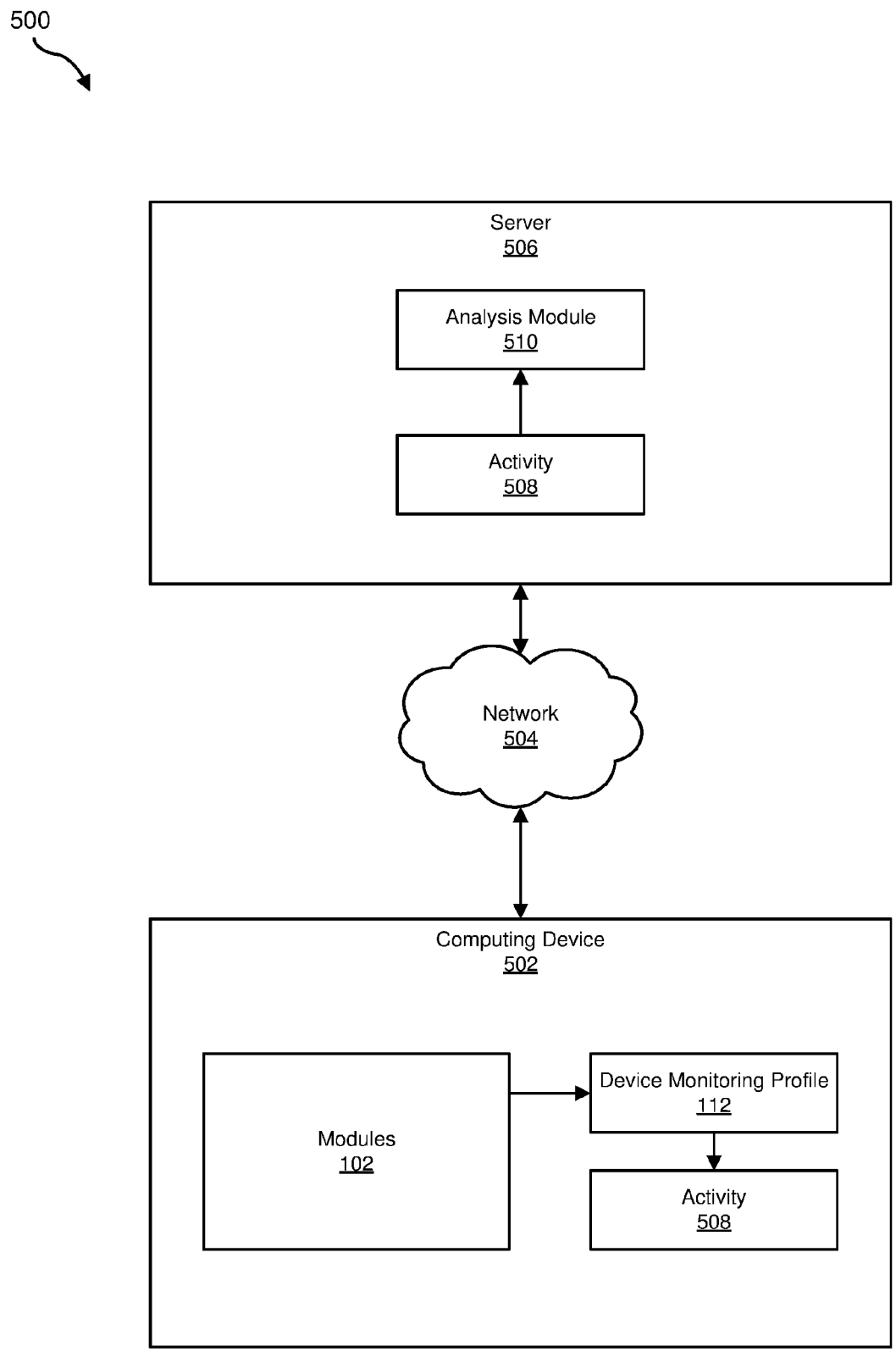
FIG. 5 is a block diagram of an example computing system for selectively monitoring devices.

In some examples, monitoring module 110 may monitor activity performed on the device during the device-usage session in accordance with the device monitoring profile by sending information about the activity performed on the device during the device-usage session to a server that analyzes the activity for suspicious behavior. For example, as illustrated in FIG. 5, modules 102 on a computing device 502 may monitor activity 508 in accordance with device monitoring profile 112. In one embodiment, modules 102 may send information about activity 508 to a server 506 via a network 504. In some embodiments, an analysis module 510 on server 506 may analyze information about activity 508 to detect suspicious behavior. Although illustrated as a single server, in some embodiments server 506 may represent one or more servers stored in the same location and/or different locations (e.g., cloud servers).

In some examples, monitoring module 110 may send screenshots, recordings, and/or other data to server 506. In some embodiments, analysis module 510 may perform image recognition, sentiment analysis, and/or other types of analysis to detect suspicious behavior. Examples of suspicious behavior may include, without limitation, illegal behavior, conversations with suspicious entities (e.g., scammers, predators, and/or other malicious individuals), and/or unapproved behavior (e.g., making plans and/or accessing material of which an adult guardian of a minor user does not approve).

Figure 6:
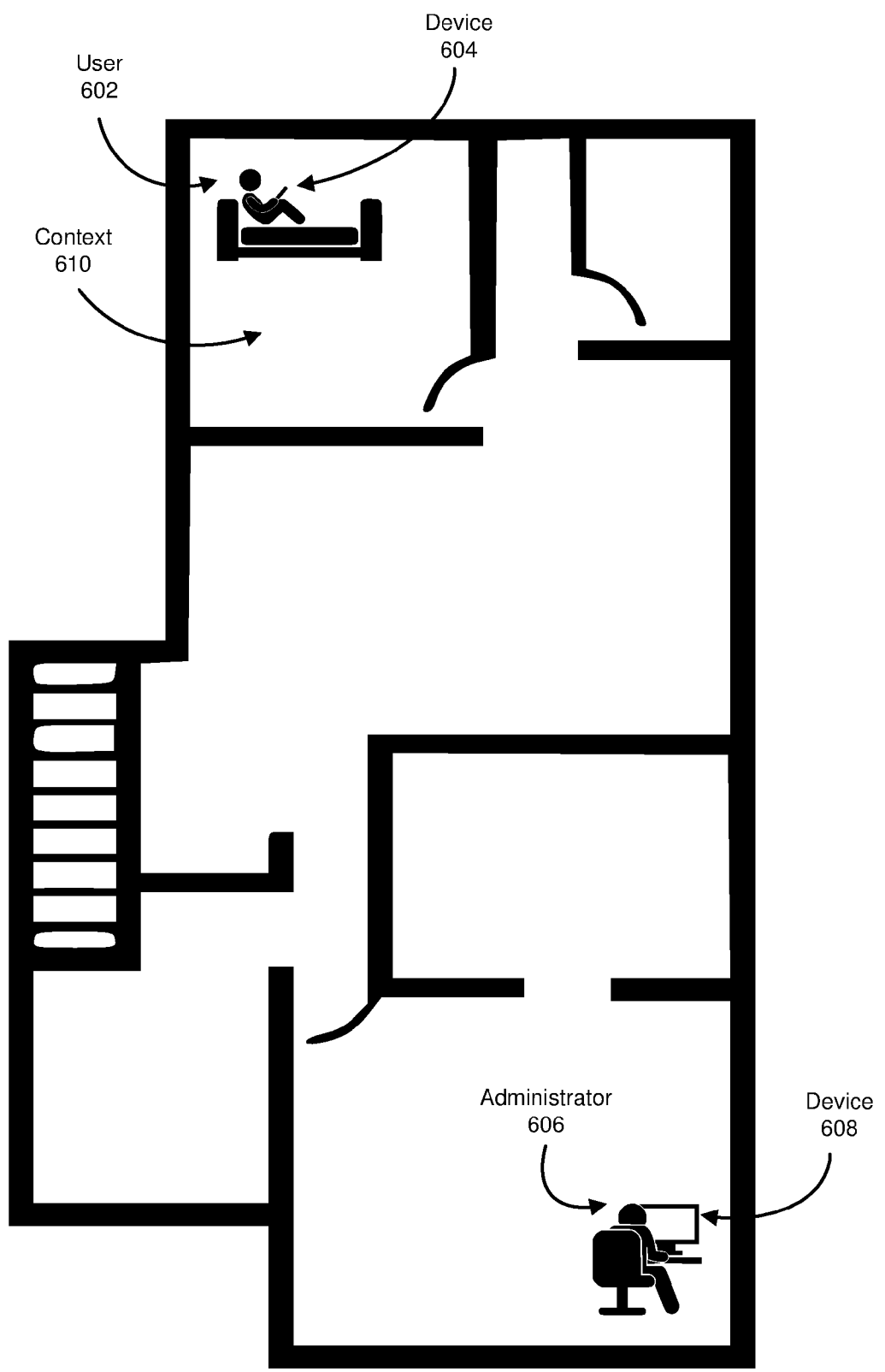
FIG. 6 is an illustration of an example device user and device administrator.

In some examples, the systems described herein may enable an adult administrator of a device to configure selective monitoring of the actions of a minor user of a device. For example, as illustrated in FIG. 6, an administrator 606 may configure the systems described herein on a device 604 that is operated by a user 602. In some examples, user 602 may use initiate a device-usage session on device 604 in a context 610 that has characteristics that the systems described herein identify as suspicious, such as taken place when user 602 is alone in an enclosed space during nighttime hours. In some embodiments, the systems described herein may send information about activity on device 604 to a device 608 operated by administrator 606.

As explained above in connection with method 300 in FIG. 3, the systems described herein may selectively monitor a device based on characteristics of a device-usage session in order to provide an appropriate level of monitoring that does not consume excess resources. For example, if a device user is in a public area such as a library surrounded by trusted adults and is browsing educational web sites, the systems described herein may perform a low level of monitoring. In another example, if a device user is alone in their bedroom talking in a hushed voice to a stranger via a video chat application, the systems described herein may perform a high level of monitoring that may include recording video, audio, and/or other information for later analysis. By calibrating the level of monitoring based on the characteristics of the device-usage session, the systems described herein may consistently identify suspicious behavior while efficiently using computing resources. In some embodiments, the systems described herein may improve a computing device by improving the ability of the computing device to monitor activity on the computing device while decreasing the computing resources required for monitoring.

Figure 7:
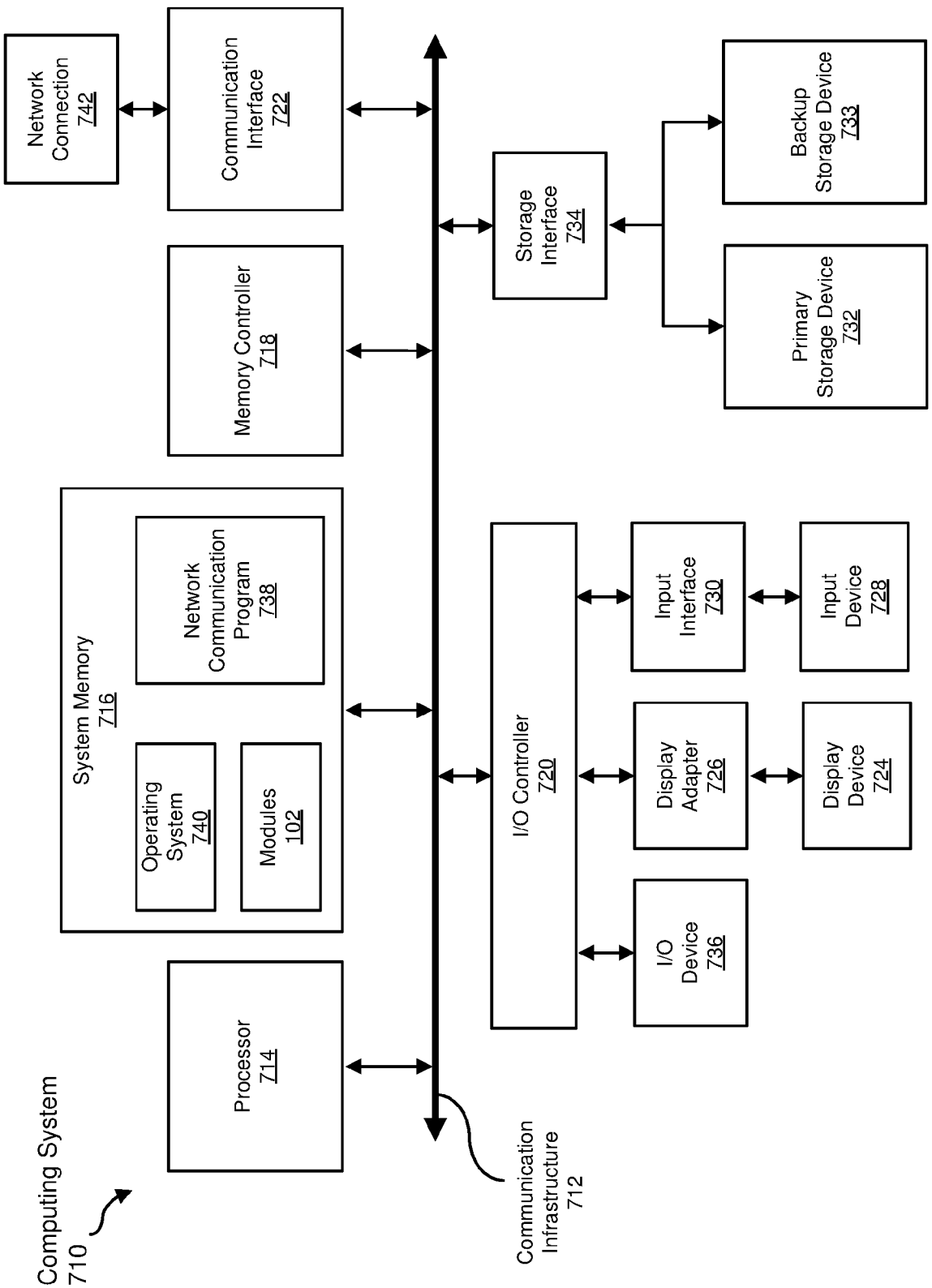
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
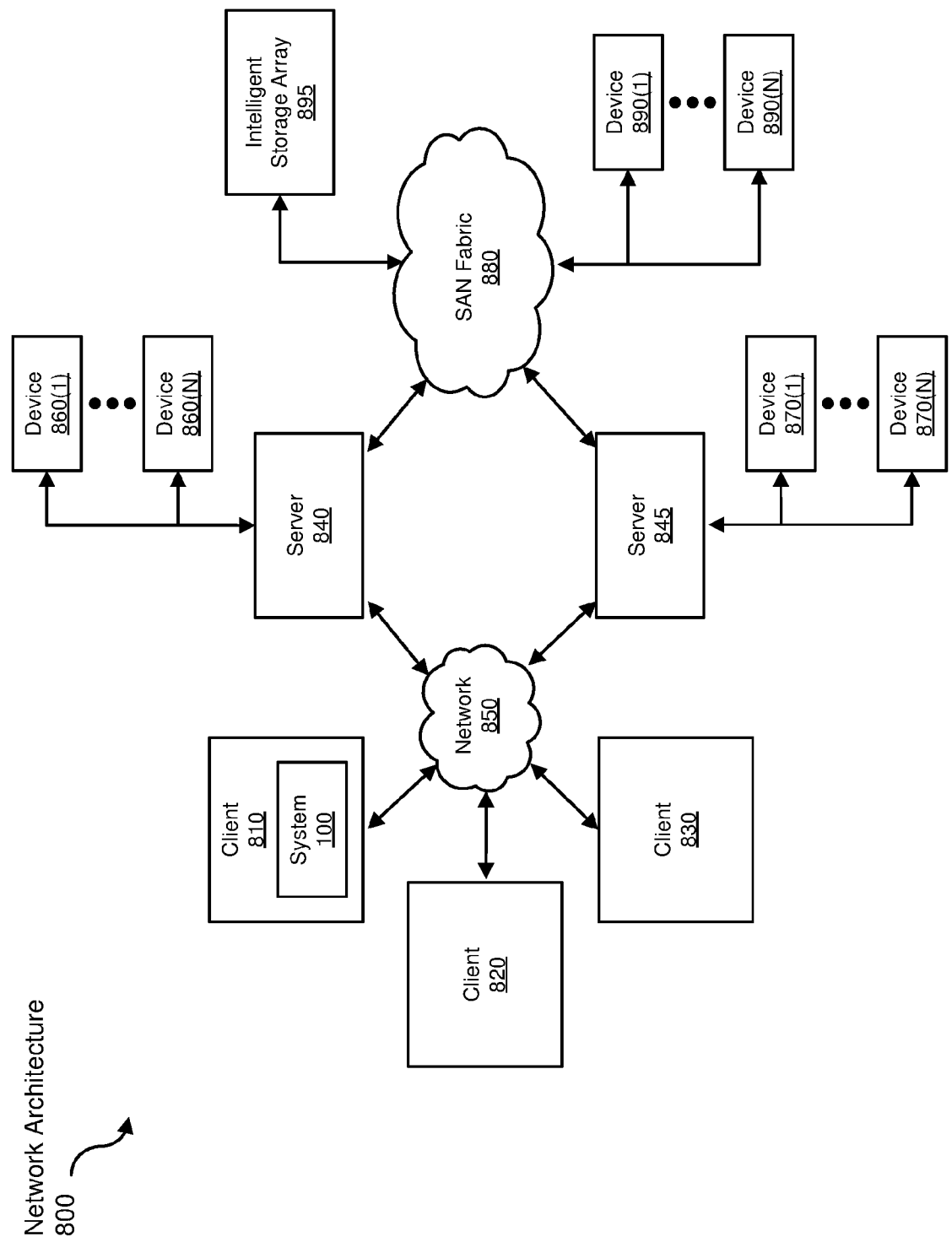
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for selectively monitoring devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive device activity data to be transformed, transform the device activity data by using the device activity data as input into a privacy score calculation algorithm, output a result of the transformation to calculate a privacy score, use the result of the transformation to determine an appropriate monitoring level, and store the result of the transformation to a log. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selectively monitoring devices, at least a portion of the method being performed by a computing device comprising at least one processor, the method comprising:
- defining, based at least in part on a physical location of a device that is subject to a monitoring policy, a start of a device-usage session for the device;
- identifying, in response to defining the start of the device-usage session, a set of characteristics of the device-usage session;
- calculating, based on the set of characteristics, a privacy score for the device-usage session that corresponds to a probability that the device-usage session comprises suspicious behavior;
- selecting, for the device, a device monitoring profile that is correlated with the privacy score and that defines hardware components of the device to be monitored via monitoring actions and an intensity level of each monitoring action to be performed on the device;
- monitoring hardware componets of the device during the device-usage session in accordance with the device monitoring profile that is correlated with the privacy score for the device-usage session; and
- ending the device-usage session and defining an additional device-usage session for the device based at least in part on determining that the device has moved to a new location.

2. The computer-implemented method of claim 1, wherein monitoring hardware components of the device during the device-usage session in accordance with the device monitoring profile comprises sending information about activity performed on the device during the device-usage session to a server that analyzes the activity for suspicious behavior.

3. The computer-implemented method of claim 1, wherein identifying the set of characteristics comprises identifying a type of a current location of the device via at least one of:
- a geolocation of the current location of the device;
- still images of the current location of the device captured by a camera of the device;
- video of the current location of the device captured by a camera of the device; and
- a wireless network to which the device is connected.

4. The computer-implemented method of claim 1, wherein monitoring hardware components of the device comprises monitoring at least one of:
- a front-facing camera;
- a rear-facing camera; or
- a microphone.

5. The computer-implemented method of claim 1, wherein identifying the set of characteristics comprises identifying current activity performed on the device by a user via at least one of:
- monitoring active applications on the device;
- taking screenshots of the device;
- monitoring a camera of the device; and
- monitoring a microphone of the device.

6. The computer-implemented method of claim 1, wherein calculating the privacy score for the device-usage session comprises comparing current values for the set of characteristics to recorded patterns of activity for the set of characteristics to determine whether the current values match the recorded patterns of activity.

7. The computer-implemented method of claim 1, wherein calculating, based on the set of characteristics, the privacy score for the device-usage session comprises calculating the privacy score based on a custom weighting for the set of characteristics supplied by an administrator of the device.

8. The computer-implemented method of claim 1, wherein the monitoring actions comprise at least one of:
- recording a video of activity on the device;
- recording a screenshot of activity on the device; and
- recording audio of activity on the device.

9. The computer-implemented method of claim 1, wherein selecting, for the device, the device monitoring profile that is correlated with the privacy score comprises selecting the device monitoring profile from a set of monitoring profiles wherein, for each monitoring profile, an amount of computing resources consumed by monitoring the device in accordance with the monitoring profile is directly correlated with a privacy score associated with the monitoring profile.

10. A system for selectively monitoring devices, the system comprising:
- an identification module, stored in memory, that:
  - defines, based at least in part on a physical location of a device that is subject to a monitoring policy, a start of a device-usage session for the device; and
  - identifies, in response to defining the start of the device-usage session, a set of characteristics of the device-usage session;
- a calculation module, stored in memory, that calculates, based on the set of characteristics, a privacy score for the device-usage session that corresponds to a probability that the device-usage session comprises suspicious behavior;
- a selection module, stored in memory, that selects, for the device, a device monitoring profile that is correlated with the privacy score and that defines hardware components of the device to be monitored via monitoring actions and an intensity level of each monitoring action to be performed on the device;
- a monitoring module, stored in memory, that monitors hardware components of the device during the device-usage session in accordance with the device monitoring profile that is correlated with the privacy score for the device-usage session; and
- at least one physical processor that executes the identification module, the calculation module, the selection module, and the monitoring module; and
- wherein the identification module ends the device-usage session and defines an additional device-usage session for the device based at least in part on determining that the device has moved to a new physical location.

11. The system of claim 10, wherein the monitoring module sends information about activity performed on the device during the device-usage session to a server that analyzes the activity for suspicious behavior.

12. The system of claim 10, wherein the identification module identifies the set of characteristics by identifying a type of a current location of the device via at least one of:
- a geolocation of the current location of the device;
- still images of the current location of the device captured by a camera of the device;
- video of the current location of the device captured by a camera of the device; and
- a wireless network to which the device is connected.

13. The system of claim 10, wherein monitoring hardware components of the device comprises monitoring at least one of:
- a front facing camera;
- a rear-facing camera; or
- a microphone.

14. The system of claim 10, wherein the identification module identifies the set of characteristics by identifying current activity performed on the device by a user via at least one of:
- monitoring active applications on the device;
- taking screenshots of the device;
- monitoring a camera of the device; and
- monitoring a microphone of the device.

15. The system of claim 10, wherein the calculation module calculates the privacy score for the device-usage session by comparing current values for the set of characteristics to recorded patterns of activity for the set of characteristics to determine whether the current values match the recorded patterns of activity.

16. The system of claim 10, wherein the calculation module calculates, based on the set of characteristics, the privacy score for the device-usage session by calculating the privacy score based on a custom weighting for the set of characteristics supplied by an administrator of the device.

17. The system of claim 10, wherein the monitoring actions comprise at least one of:
- recording a video of activity on the device;
- recording a screenshot of activity on the device; and
- recording audio of activity on the device.

18. The system of claim 10, wherein the selection module selects, for the device, the device monitoring profile that is correlated with the privacy score by selecting the device monitoring profile from a set of monitoring profiles wherein, for each monitoring profile, an amount of computing resources consumed by monitoring the device in accordance with the monitoring profile is directly correlated with a privacy score associated with the monitoring profile.

19. A non-transitory computer-readable medium comprising one or more computer-readable instructions that, when executed by at least one processor of a computing device, cause the computing device to:
- define, based at least in part on a physical location of a device that is subject to a monitoring policy, a start of a device-usage session for the device;
- identify, in response to defining the start of the device-usage session, a set of characteristics of the device-usage session;
- calculate, based on the set of characteristics, a privacy score for the device-usage session that corresponds to a probability that the device-usage session comprises suspicious behavior;
- select, for the device, a device monitoring profile that is correlated with the privacy score and that defines hardware components of device to be monitored via monitoring actions and an intensity level of each monitoring action to be performed on the device;
- monitor hardware components of the device during the device-usage session in accordance with the device monitoring profile that is correlated with the privacy score for the device-usage session; and
- end the device usage session and define an additional device-usage session for the device based at least in part on determining that the device has moved to a new physical location.

20. The non-transitory computer-readable medium of claim 19, wherein the one or more computer-readable instructions cause the computing device to monitor activity performed on the device during the device-usage session in accordance with the device monitoring profile by sending information about the activity performed on the device during the device-usage session to a server that analyzes the activity for suspicious behavior.

* * * * *